United States Patent Office 3,082,263
Patented Mar. 19, 1963

---

3,082,263
PROCESS FOR THE MANUFACTURE OF 2-BROMO-2-CHLORO-1,1,1-TRIFLUOROETHANE
Robert Leslie McGinty, Widnes, England, assignor to Imperial Chemical Industries Limited, London, England, a corporation of Great Britain
No Drawing. Filed Aug. 29, 1960, Ser. No. 52,355
Claims priority, application Great Britain Sept. 19, 1959
2 Claims. (Cl. 260—653)

This invention relates to a novel method for the manufacture of 2-bromo-2-chloro-1,1,1-trifluoroethane which is widely used as a non-toxic, non-explosive, inhalation anaesthetic.

In patent specification No. 767,779 one process for the manufacture of 2-bromo-2-chloro-1,1,1-trifluoroethane is disclosed which comprises brominating 2-chloro-1,1,1-trifluoroethane. This process is suitably effected in the gaseous phase at a temperature in the range 350° C. to 600° C. but there is generally formed in the crude reaction product in addition to the desired 2-bromo-2-chloro-1,1,1-trifluoroethane a certain amount of an undesired dibromo compound, namely 2:2 - dibromo - 2-chloro-1,1,1-trifluoroethane.

According to the present invention a process for the manufacture of 2-bromo-2-chloro-1,1,1-trifluoroethane comprises reducing 2,2-dibromo-2-chloro-1,1,1-trifluoroethane.

One source of the dibromo starting material is to be obtained from the fractional distillation of the crude product previously referred to which contains the dibromo compound and 2-bromo-2-chloro-1,1,1-trifluoroethane.

The reduction may for example be effected by means of nascent hydrogen, and a convenient reducing system is one based on iron and an acid, for example hydrochloric acid or acetic acid. Alternatively the reduction may be brought about catalytically, using a conventional hydrogenation catalyst, for example, palladium on charcoal.

The following examples illustrate but do not limit the invention.

*Example 1*

Into a flask equipped with a stirrer, dropping funnel and reflux condenser were placed 825 g. 2,2-dibromo-2-chloro-1,1,1-trifluoroethane, 320 g. mild steel turnings and 1000 g. water. The mixture was heated to reflux and 760 cc. of 36° Tw. hydrochloric acid were added over 3 hours, the reflux temperature finally falling to 66° C. The contents of the flask were fractionally distilled and three fractions were obtained, namely, 2-bromo-2-chloro-1,1,1-trifluoroethane, 2,2 - dibromo - 2-chloro-1,1,1-trifluoroethane and 1,1,1,4,4,4-hexafluoro-2,3-dichloro-butene-2.

*Example 2*

In a 5 litre stirred flask fitted with reflux condenser, dropping funnel and thermometer were placed 670 g. of $CF_3CClBr_2$, 1 litre of water and 448 g. of mild steel turnings. The mixture was heated to reflux and 1200 ml. of 30% HCl were added over 1½ hours, the reflux temperature falling from 77° C. to 66° C. A further 500 ml. of HCl were added and reflux was continued for a further 3 hours, the reflux temperature becoming constant at 64° C. The contents of the flask were fractionally distilled and analysed. 74% of the $CF_3CClBr_2$ was consumed in the reaction and $CF_3CHlBr$ was obtained in 45% yield based on $CF_3CClBr_2$ consumed. 20% of the starting material was converted to 1,1,1,4,4,4-hexafluoro-2,3-dichloro-butene-2.

*Example 3*

In the apparatus described in Example 2 were placed 825 g. of $CF_3CClBr_2$, 2½ litres of water and 290 g. of mild steel turnings. The mixture was heated to reflux and 650 cc. of glacial acetic acid were then added over 3 hours, the reflux temperature falling to 63° C. The organic material was distilled from the flask and fractionated. 154 g. of material B.P. 50–52° C. were obtained. This was substantially $CF_3CHClBr$, the conversion of $CF_3CClBr_2$ to this compound being 26%.

What I claim is:
1. A process for the manufacture of 2-bromo-2-chloro-1,1,1-trifluoroethane which comprises reducing 2,2-dibromo-2-chloro-1,1,1-trifluoroethane by contacting it with nascent hydrogen produced in situ by interaction of iron and an acid.
2. A process as claimed in claim 1 in which the acid is a member of the group consisting of hydrochloric acid and acetic acid.

References Cited in the file of this patent
UNITED STATES PATENTS 2,635,121 Smith et al. _____ Apr. 14, 1953
2,760,997 Rucker et al. _____ Aug. 28, 1956

OTHER REFERENCES

Lovelace: Aliphatic Fluorine Compounds, page 44, Reinhold Pub. Co. (1958).

UNITED STATES PATENT OFFICE
CERTIFICATE OF CORRECTION

Patent No. 3,082,263            March 19, 1963

Robert Leslie McGinty

It is hereby certified that error appears in the above numbered patent requiring correction and that the said Letters Patent should read as corrected below.

In the heading to the printed specification, line 8, for "Sept. 19, 1959" read -- Sept. 9, 1959 --; column 2, line 16, for the compound "$CF_3CH1Br$" read -- $CF_3CHClBr$ --.

Signed and sealed this 8th day of October 1963.

(SEAL)
Attest:

ERNEST W. SWIDER            EDWIN L. REYNOLDS
Attesting Officer            Acting Commissioner of Patents